(12) United States Patent
Langen et al.

(10) Patent No.: US 7,661,027 B2
(45) Date of Patent: Feb. 9, 2010

(54) SIP SERVER ARCHITECTURE FAULT TOLERANCE AND FAILOVER

(75) Inventors: Anno R. Langen, Berkeley, CA (US); Reto Kramer, Berkeley, CA (US); David Connelly, San Francisco, CA (US); Rao Nasir Khan, Fremont, CA (US); John Beatty, Redwood City, CA (US); Ioannis Cosmadopoulos, San Francisco, CA (US); Manoj Cheenath, San Ramon, CA (US)

(73) Assignee: BEA Systems, Inc., Redwood Shores, CA (US)

( * ) Notice: Subject to any disclaimer, the term of this patent is extended or adjusted under 35 U.S.C. 154(b) by 455 days.

(21) Appl. No.: 11/545,648

(22) Filed: Oct. 10, 2006

(65) Prior Publication Data

US 2008/0155310 A1    Jun. 26, 2008

(51) Int. Cl.
    *G06F 11/00* (2006.01)
(52) U.S. Cl. ...................................................... 714/15
(58) Field of Classification Search ............... 714/3, 714/16
    See application file for complete search history.

(56) References Cited

U.S. PATENT DOCUMENTS

| | | | |
|---|---|---|---|
| 5,440,727 A * | 8/1995 | Bhide et al. ................. | 711/117 |
| 5,659,596 A | 8/1997 | Dunn | |
| 6,052,724 A | 4/2000 | Willie et al. | |
| 6,067,301 A | 5/2000 | Aatresh | |
| 6,134,673 A * | 10/2000 | Chrabaszcz ................... | 714/13 |
| 6,208,870 B1 | 3/2001 | Lorello et al. | |
| 6,292,833 B1 | 9/2001 | Liao et al. | |
| 6,480,862 B1 | 11/2002 | Gall | |
| 6,578,076 B1 | 6/2003 | Putzolu | |
| 6,611,867 B1 | 8/2003 | Bowman-Amuah | |
| 6,621,793 B2 | 9/2003 | Widegren et al. | |
| 6,625,751 B1 * | 9/2003 | Starovic et al. ............... | 714/11 |
| 6,629,260 B1 * | 9/2003 | Dancer et al. .................. | 714/3 |
| 6,708,206 B1 | 3/2004 | Thrane et al. | |
| 6,823,477 B1 * | 11/2004 | Cheng et al. .................. | 714/26 |

(Continued)

OTHER PUBLICATIONS

BEA Systems, Inc. BEA WebLogic SIP Server: Configuring and Managing WebLogic SIP Server. Dec. 2, 2005. BEA Systems, Inc. Version 2.1. p. 4-13.*

(Continued)

*Primary Examiner*—Nadeem Iqbal
(74) *Attorney, Agent, or Firm*—Fliesler Meyer LLP

(57) ABSTRACT

The SIP server can be comprised of an engine tier and a state tier distributed on a cluster network. Engine nodes in the engine tier can process SIP messages and can read/write state information from/to the state tier. State tier can maintain state information in a set of partitions of one or more replicas which contain duplicate information. The engine nodes can be adapted to detect and report replica failures and the replicas can in turn be adapted to detect and report engine node failures. Replicas can detect faults with an engine node if the engine node fails to poll the replica for a specified period of time and can then report the failure. The engine node can detect failures of a replica when reading or writing state information and can report the failure to another replica, which can be responsible for updating the partition view to exclude dead replicas.

11 Claims, 9 Drawing Sheets

U.S. PATENT DOCUMENTS

| | | | |
|---|---|---|---|
| 6,862,689 B2 | 3/2005 | Bergsten et al. | |
| 6,988,133 B1 | 1/2006 | Zavalkovsky et al. | |
| 7,039,037 B2 | 5/2006 | Wang et al. | |
| 7,050,424 B2 | 5/2006 | Cheng et al. | |
| 7,058,046 B2 | 6/2006 | Celi et al. | |
| 7,076,562 B2 | 7/2006 | Singhal et al. | |
| 7,082,102 B1 | 7/2006 | Wright | |
| 7,142,876 B2 | 11/2006 | Trossen et al. | |
| 7,283,539 B2 | 10/2007 | Wang et al. | |
| 7,301,905 B1 | 11/2007 | Tontiruttananon et al. | |
| 7,392,421 B1* | 6/2008 | Bloomstein et al. | 714/4 |
| 7,464,178 B2 | 12/2008 | Corrigan et al. | |
| 7,506,194 B2* | 3/2009 | Appanna et al. | 714/3 |
| 2001/0030970 A1 | 10/2001 | Wiryaman et al. | |
| 2002/0036983 A1 | 3/2002 | Widegren et al. | |
| 2002/0039352 A1 | 4/2002 | El-Fekih et al. | |
| 2002/0073404 A1 | 6/2002 | Sokolov et al. | |
| 2002/0077134 A1 | 6/2002 | Mizell et al. | |
| 2002/0129174 A1 | 9/2002 | LaBaw | |
| 2002/0144119 A1 | 10/2002 | Benantar | |
| 2002/0159387 A1 | 10/2002 | Allison et al. | |
| 2003/0028529 A1 | 2/2003 | Cheung et al. | |
| 2003/0033524 A1 | 2/2003 | Tran et al. | |
| 2003/0055920 A1 | 3/2003 | Kakadia et al. | |
| 2003/0093695 A1 | 5/2003 | Dutta | |
| 2003/0095540 A1 | 5/2003 | Mulligan et al. | |
| 2003/0125021 A1 | 7/2003 | Tell et al. | |
| 2003/0158908 A1* | 8/2003 | Jacobs et al. | 709/214 |
| 2004/0002881 A1 | 1/2004 | Hu et al. | |
| 2004/0116117 A1 | 6/2004 | Ahvonen et al. | |
| 2004/0148357 A1 | 7/2004 | Corrigan et al. | |
| 2004/0168162 A1 | 8/2004 | Park et al. | |
| 2004/0196858 A1 | 10/2004 | Tsai et al. | |
| 2004/0223602 A1 | 11/2004 | Honkasalo et al. | |
| 2004/0260967 A1* | 12/2004 | Guha et al. | 714/3 |
| 2004/0267882 A1 | 12/2004 | Whynot et al. | |
| 2005/0005022 A1 | 1/2005 | Taylor | |
| 2005/0022047 A1* | 1/2005 | Chandrasekaran | 714/4 |
| 2005/0152336 A1 | 7/2005 | Bratt et al. | |
| 2005/0185661 A1 | 8/2005 | Scott et al. | |
| 2005/0203962 A1* | 9/2005 | Zhou et al. | 707/200 |
| 2005/0203994 A1 | 9/2005 | Palmer et al. | |
| 2005/0207432 A1 | 9/2005 | Velez-Rivera et al. | |
| 2005/0237999 A1 | 10/2005 | Shores et al. | |
| 2005/0259806 A1 | 11/2005 | Chang | |
| 2006/0002333 A1 | 1/2006 | Skog et al. | |
| 2006/0010224 A1 | 1/2006 | Sekar et al. | |
| 2006/0109818 A1 | 5/2006 | Ramanna et al. | |
| 2006/0128409 A1 | 6/2006 | Gress et al. | |
| 2006/0225108 A1 | 10/2006 | Tabassi et al. | |
| 2007/0005766 A1 | 1/2007 | Singhal et al. | |
| 2007/0011617 A1 | 1/2007 | Akagawa et al. | |
| 2007/0091874 A1 | 4/2007 | Rockel et al. | |
| 2008/0021939 A1 | 1/2008 | Dahlstedt et al. | |
| 2008/0046963 A1 | 2/2008 | Grayson et al. | |
| 2008/0126832 A1* | 5/2008 | Morosan et al. | 714/4 |

OTHER PUBLICATIONS

International Search Report and Written Opinion for PCT/US06/11165 dated Oct. 22, 2007 (7 pages).

Kristensen, A., "SIP Servlet API Version 1.0," Internet article [online], Feb. 4, 2003, http://jcp.org/en/jsr/detail?id=116> [retrieved on Mar. 6, 2009], p. 1—section 1, p. 4—section 1.4.2.

O'Doherty, P. et al., "SIP and the Java Platforms," Internet article [online], Jun. 2003, Sun Microsystems homepage, http://java.sun.com/products/jain/SIP-and-Java.html> [retrieved on Mar. 6, 2009], sections 1, 2.2, 4, 6.

Zhuang et al., Policy Based QoS Architecture in the IP Multimedia Subsystem of UMTS, IEEE Network, May/Jun. 2003, pp. 51-57.

* cited by examiner

SIP SERVER ARCHITECTURE FAULT TOLERANCE AND FAILOVER

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS REFERENCE TO RELATED APPLICATIONS

The following commonly owned, co-pending United States Patents and Patent Applications, including the present application, are related to each other. Each of the other patents/applications are incorporated by reference herein in their entirety:

U.S. patent application Ser. No. 11/378,188, entitled SYSTEM AND METHOD FOR MANAGING COMMUNICATIONS SESSIONS IN A NETWORK, by Reto Kramer, et al., filed on Mar. 17, 2006;

U.S. patent application Ser. No. 11/384,056, entitled SYSTEM AND METHOD FOR A GATEKEEPER IN A COMMUNICATIONS NETWORK, by Reto Kramer, et al., filed on Mar. 17, 2006;

U.S. Patent Application No. 60/801,091 entitled SIP AND HTTP CONVERGENCE IN NETWORK COMPUTING ENVIRONMENTS, by Anno Langen, et al., filed on May 16, 2006;

U.S. Patent Application No. 60/800,943 entitled HITLESS APPLICATION UPGRADE FOR SIP SERVER ARCHITECTURE, by Anno Langen, et al., filed on May 16, 2006;

U.S. Patent Application No. 60/801,083 ENGINE NEAR CACHE FOR REDUCING LATENCY IN A TELECOMMUNICATIONS ENVIRONMENT, by Anno Langen, et al., filed on May 16, 2006;

U.S. patent application Ser. No. 11/434,022 entitled SYSTEM AND METHOD FOR CONTROLLING DATA FLOW BASED UPON A TEMPORAL POLICY, by Narendra Vemula, et al., filed on May 15, 2006;

U.S. patent application Ser. No. 11/434,024 entitled SYSTEM AND METHOD FOR CONTROLLILNG ACCESS TO LEGACY PUSH PROTOCOLS BASED UPON A POLICY, by Bengt-Inge Jakobsson, et al., filed on May 15, 2006;

U.S. patent application Ser. No. 11/434,010 entitled SYSTEM AND METHOD FOR CONTROLLING ACCESS TO LEGACY MULTIMEDIA MESSAGE PROTOCOLS BASED UPON A POLICY, by Andreas Jansson, filed on May 15, 2006;

U.S. patent application Ser. No. 11/434,025 entitled SYSTEM AND METHOD FOR CONTROLLING ACCESS TO LEGACY SHORT MESSAGE PEER-TO-PEER PROTOCOLS BASED UPON A POLICY, by Andreas Jansson, filed on May 15, 2006;

U.S. patent application Ser. No. 11/432,934 entitled SYSTEM AND METHOD FOR SHAPING TRAFFIC, by Jan Svensson, filed on May 12, 2006.

FIELD OF THE INVENTION

The current invention relates generally to managing telecommunications and more particularly to providing failover and fault tolerance for a SIP server architecture.

BACKGROUND

Conventionally, telecommunications and network infrastructure providers have relied on often decades old switching technology to providing routing for network traffic. Businesses and consumers, however, are driving industry transformation by demanding new converged voice, data and video services. The ability to meet these demands often can be limited by existing IT and network infrastructures that are closed, proprietary and too rigid to support these next generation services. As a result, telecommunications companies are transitioning from traditional, circuit-switched Public Switched Telephone Networks (PSTN), the common wired telephone system used around the world to connect any one telephone to another telephone, to Voice Over Internet Protocol (VoIP) networks. VoIP technologies enable voice communication over "vanilla" IP networks, such as the public Internet. Additionally, a steady decline in voice revenues has resulted in heightened competitive pressures as carriers vie to grow data/service revenues and reduce churn through the delivery of these more sophisticated data services. Increased federal regulation, security and privacy issues, as well as newly emerging standards can further compound the pressure.

However, delivering these more sophisticated data services has proved to be more difficult than first imagined. Existing IT and network infrastructures, closed proprietary network-based switching fabrics and the like have proved to be too complex and too rigid to allow the creation and deployment of new service offerings. Furthermore, failover and fault tolerance have become important issues in telecommunications environments as more and more users expect continuous and uninterrupted service from their devices.

DETAILED DESCRIPTION

The invention is illustrated by way of example and not by way of limitation in the figures of the accompanying drawings in which like references indicate similar elements. References to embodiments in this disclosure are not necessarily to the same embodiment, and such references mean at least one. While specific implementations are discussed, it is understood that this is done for illustrative purposes only. A person skilled in the relevant art will recognize that other components and configurations may be used without departing from the scope and spirit of the invention.

In the following description, numerous specific details are set forth to provide a thorough description of the invention. However, it will be apparent to those skilled in the art that the invention may be practiced without these specific details. In other instances, well-known features have not been described in detail so as not to obscure the invention.

Although a diagram may depict components as logically separate, such depiction is merely for illustrative purposes. It can be apparent to those skilled in the art that the components portrayed can be combined or divided into separate software, firmware and/or hardware components. For example, one or more of the embodiments described herein can be implemented in a network accessible device/appliance such as a router. Furthermore, it can also be apparent to those skilled in the art that such components, regardless of how they are combined or divided, can execute on the same computing device or can be distributed among different computing devices connected by one or more networks or other suitable communication means.

In accordance with embodiments, there are provided systems and methods for improving latency in message processing for a network environment via the use of SIP server architecture. In various embodiments, the SIP server can be comprised of an engine tier and a state tier distributed on a cluster network environment. The engine tier can send and receive messages and execute various processes. The state tier can maintain in-memory state data associated with various SIP sessions. For example, the state tier can store various long lived data objects and the engine tier can contain short lived data objects. The state data can be maintained in partitions comprised of state replicas. A load balancer can receive incoming message traffic and distribute it to the engine tier for processing. When processing a message, the engine can pull state data objects from the state tier, use the objects and push them back to the state tier after processing is complete. If one state replica is unavailable, such as during garbage collection, the engine can retrieve the objects from another replica in the partition.

Figure 1A:
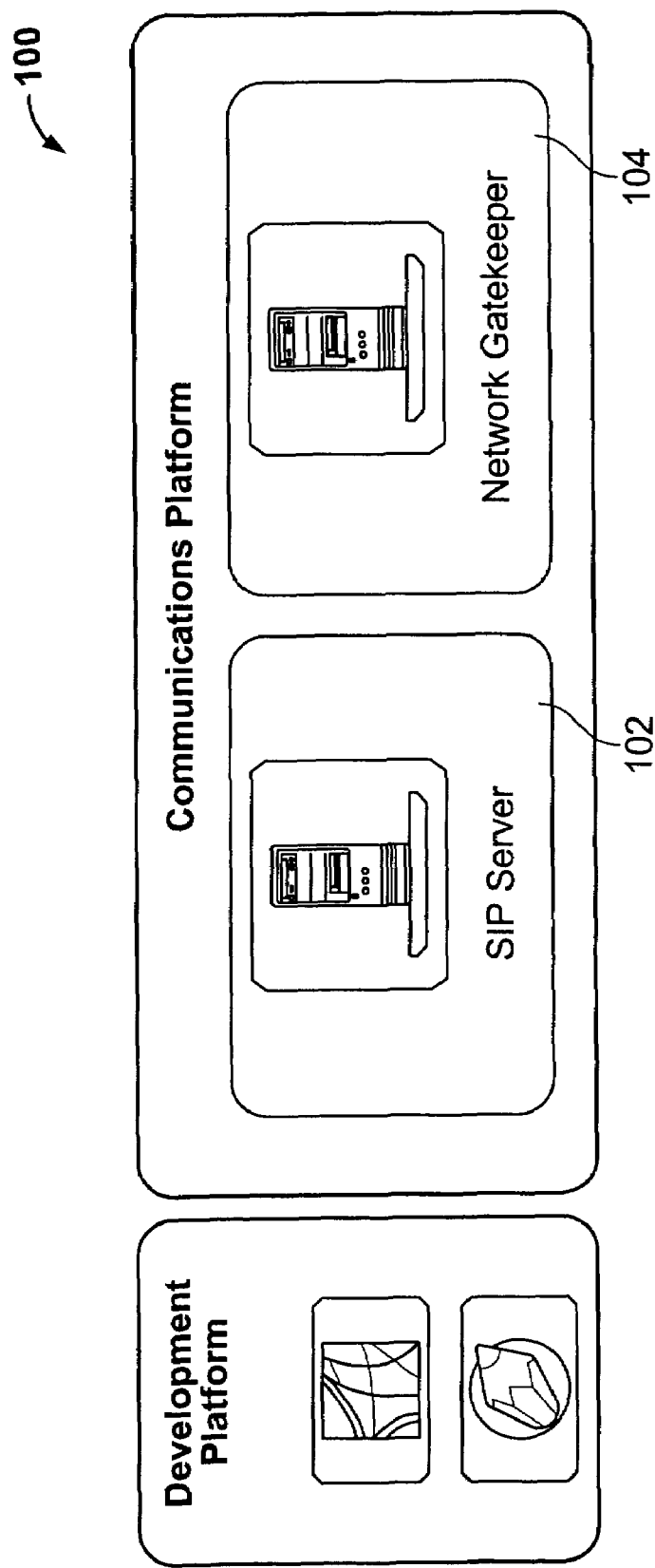
FIG. 1A is an exemplary illustration of a functional system layers in various embodiments.

FIG. 1A is an exemplary illustration of functional system layers in various embodiments of the invention. Although this diagram depicts components as logically separate, such depiction is merely for illustrative purposes. It will be apparent to those skilled in the art that the components portrayed in this figure can be arbitrarily combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

A Session Initiation Protocol (SIP) Server 102 and a Network Gatekeeper 104 can comprise a portfolio of products that collectively make up the Communications Platform 100. The SIP Server 102 provides the Communications Platform 100 with a subsystem in which application components that interact with SIP-based networks may be deployed. The Network Gatekeeper 104 provides a policy-driven telecommunications Web services gateway that allows granular control over access to network resources from un-trusted domains.

Figure 1B:
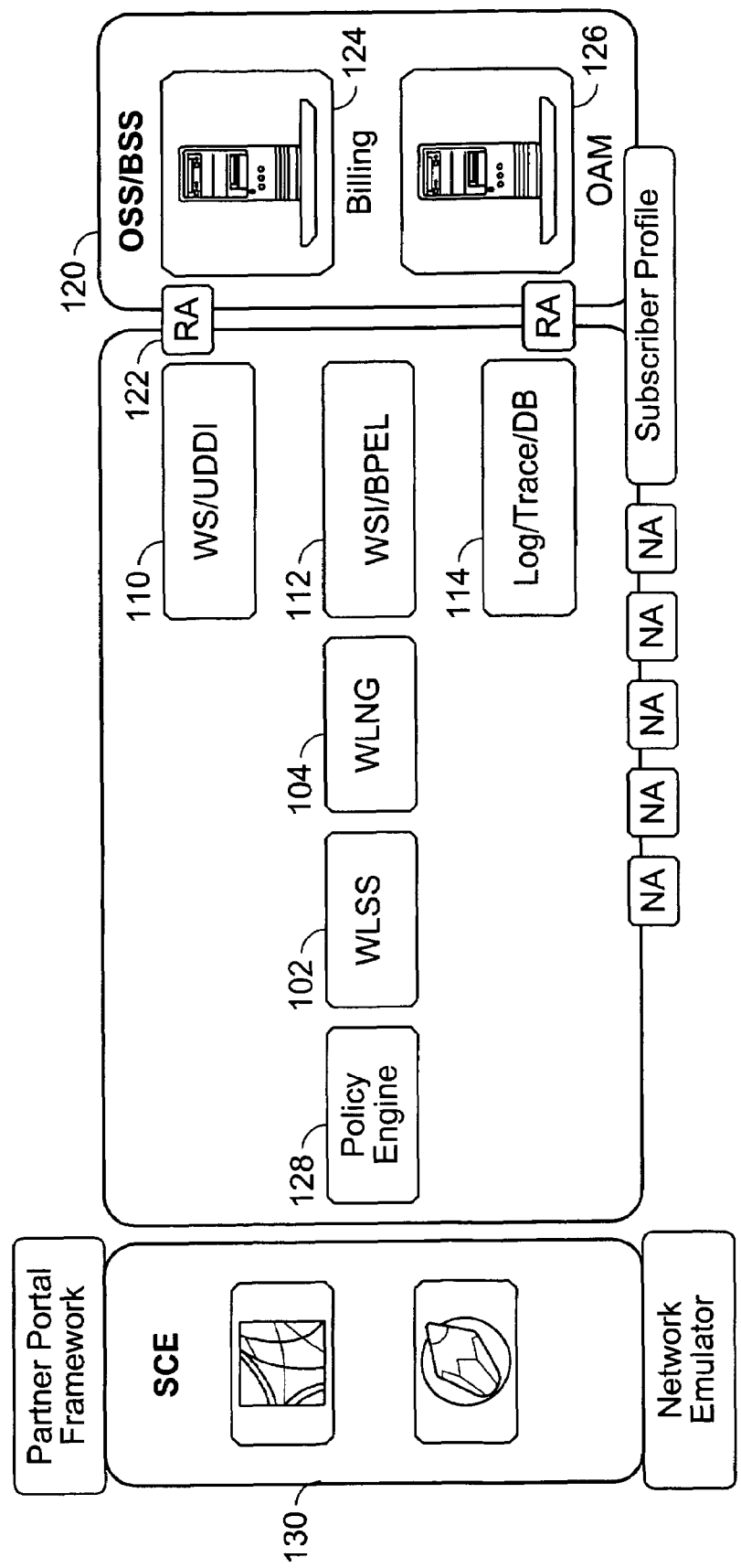
FIG. 1B is another exemplary illustration of functional system layers in a communications platform embodiment.

A variety of shared and re-usable software and service infrastructure components comprise the Communications Platform 100. For example, an Application Server, such as the WebLogic™ Application Server by BEA Systems, Inc. of San Jose, Calif. This Application Server may be augmented and adapted for deployment in telecommunications networks, while providing many features and functionality of the WebLogic Server counterpart widely deployed in enterprise computing environments. Application Server embodiments for use in the telecommunications applications can provide a variety of additional features and functionality, such as without limitation:

Optimized for Peak Throughput
Clustering for Scalability and High-Performance
Generalized for wide range of target platforms (HW/OS) support
Extensive deployment configuration options
Optimized for local management
Plug and play Enterprise Information Systems (EIS) support Analogously, communications platform embodiments can provide a variety of additional features and functionality, such as without limitation:

Highly Deterministic Runtime Environment
Clustering for High-Availability (HA) and Scalability
Optimized for Telecom HW/OS/HAM W platforms support (SAF, ATCA, HA M /W, etc.)
Hardened configuration
Optimized for Telecom NMS integration
Telecommunications network connectors and interfaces
Partitioning, replication and failover FIG. 1B is another exemplary illustration of functional system layers in a communications platform embodiment. Although this diagram depicts components as logically separate, such depiction is merely for illustrative purposes. It will be apparent to those skilled in the art that the components portrayed in this figure can be arbitrarily combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

Communications platform 100 comprises a SIP Server (WLSS) 102 and a Network Gatekeeper (WLNG) 104. Tools for interacting with Web Services, such as a Web Service—Universal Description Discovery Interface (WS/UDDI) 110, a Web Service—Business Process Execution Language (WS/BPEL) 112 may be coupled to the SIP Server 102 and the Network Gatekeeper 104 in embodiments. A log/trace and database 114 can assist with troubleshooting. In some deployments, the Communications Platform 100 can interface with an OSS/BSS system 120 via resource adapters 122. Such interfaces can provide access to billing applications 124, Operation, Administration, and Maintenance (OAM) applications 126 and others. A policy engine 128 can control the activities of the above-described components which can be implemented in a scalable cluster environment (SCE) 130.

A Communications Platform embodiment can provide an open, high performance, software based fault-tolerant platform that allows operators to maximize revenue potential by shortening time to market and significantly reducing per-service implementation and integration cost and complexity. The Communications Platform is suitable for use by for Network Infrastructure Vendor, Network Operators and Communications Service Providers in multiple deployment scenarios ranging from fully IMS oriented network architectures to hybrid and highly heterogeneous network architectures. It is not restricted to use only in carrier networks, however, and may be deployed in Enterprise communications networks without restriction or extensive customization. When deployed in conjunction with an IP Multimedia Subsystem, the Communications Platform can serve in the role of an IMS SIP Application Server and offers Communications Service Providers an execution environment in which to host applications (such as the WebLogic Network Gatekeeper), components and standard service enablers.

Figure 1C:
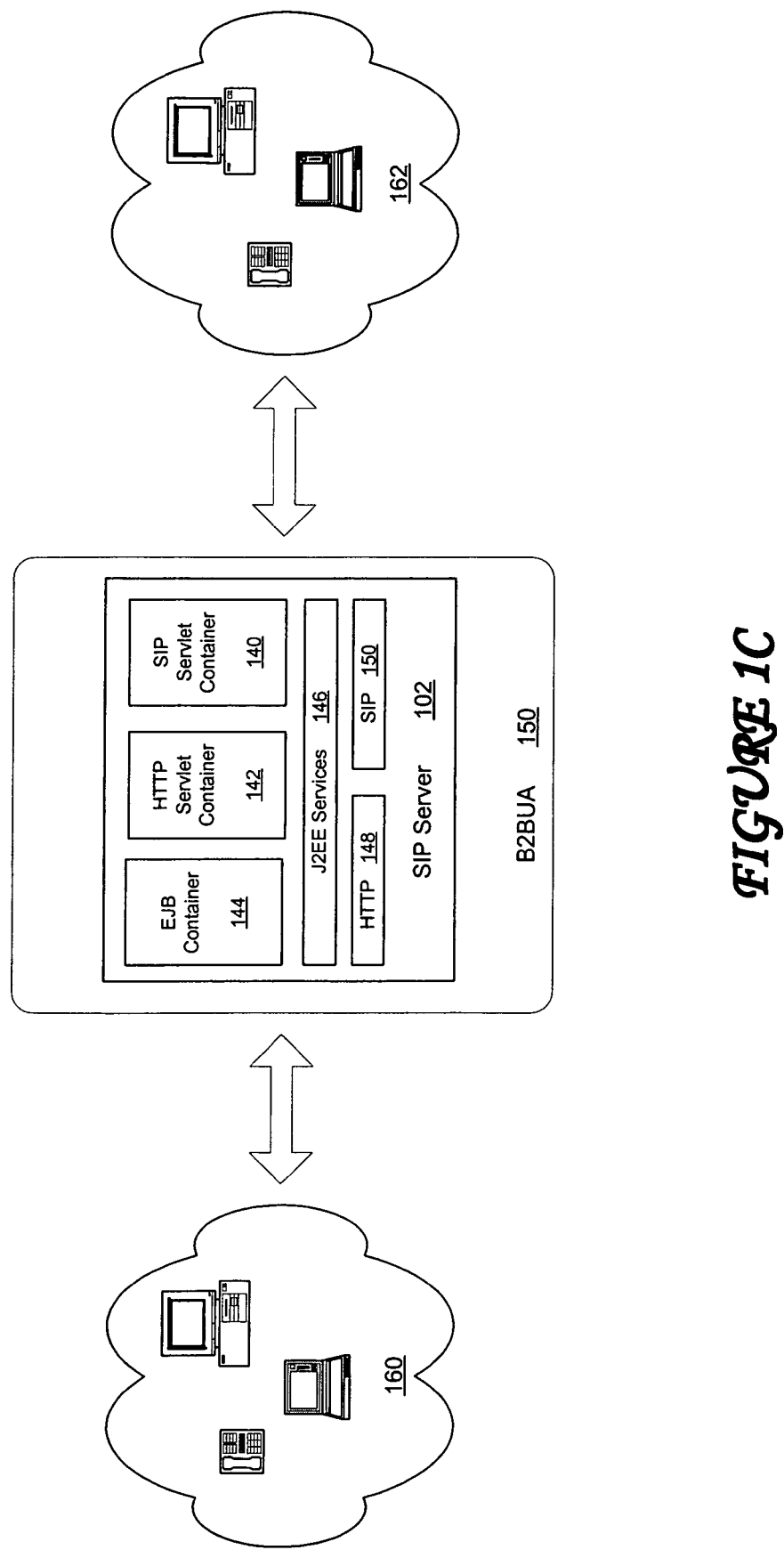
FIG. 1C is an exemplary illustration of a SIP server deployed in a production environment, in accordance with various embodiments.

FIG. 1C is an exemplary illustration of a SIP server deployed in a production environment, in accordance with various embodiments. Although this diagram depicts components as logically separate, such depiction is merely for illustrative purposes. It will be apparent to those skilled in the art that the components portrayed in this figure can be arbitrarily combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

As illustrated, the SIP server 102 can be used as a back-to-back user agent (B2BUA) 150 in a typical telecommunications environment. A B2BUA can take the place of an intermediary between communications between user agents 160, 162, including various cellular phones, wireless devices, laptops, computers, applications, and other components capable of communicating with one another electronically. The B2BUA 150 can provide multiple advantages, including controlling the flow of communication between user agents, enabling different user agents to communicate with one another (e.g. a web application can communicate with a cellular phone), as well as various security advantages. As an illustration, the user agents can transmit to the SIP server instead of communicating directly to each other and thus malicious users can be prevented from sending spam and viruses, hacking into other user agent devices, and otherwise compromising security.

The SIP server 102 can be implemented as a Java Enterprise Edition application server that has been extended with support for the session initiation protocol (SIP) as well as other operational enhancements that allow it to meet the demanding requirements of the next generation protocol-based communication networks. In one embodiment, the SIP server 102 can include an Enterprise Java Beans (EJB) container 144, a Hyper Text Transfer Protocol (HTTP) servlet container 142, an SIP servlet container 140, various Java 2 Enterprise Edition (J2EE) services 146, and SIP 150 and HTTP 148 components. The SIP stack of the server can be fully integrated into the SIP servlet container 140 and can offer much greater ease of use than a traditional protocol stack. A SIP servlet Application Programming Interface (API) can be provided in order to expose the full capabilities of the SIP protocol in the Java programming language. The SIP servlet API can define a higher layer of abstraction than simple protocol stacks provide and can thereby can free up the developer from concern about the mechanics of the SIP protocol itself. For example, the developer can be shielded from syntactic validation of received requests, handling of transaction layer timers, generation of non application related responses, generation of fully-formed SIP requests from request objects (which can involve correct preparation of system headers and generation of syntactically correct SIP messages) and handling of lower-layer transport protocols such as TCP, UDP or SCTP.

In one embodiment, the container is a server software that hosts applications (i.e. contains them). In the case of a SIP container, it hosts SIP applications. The container can perform a number of SIP functions as specified by the protocol thereby taking the burden off the applications. At the same time, the SIP container can expose the application to SIP protocol messages (via the SIP Servlet API) on which applications can perform various actions. Different applications can thus be coded and deployed to the container that provides various telecommunication and multimedia services.

Figure 2:
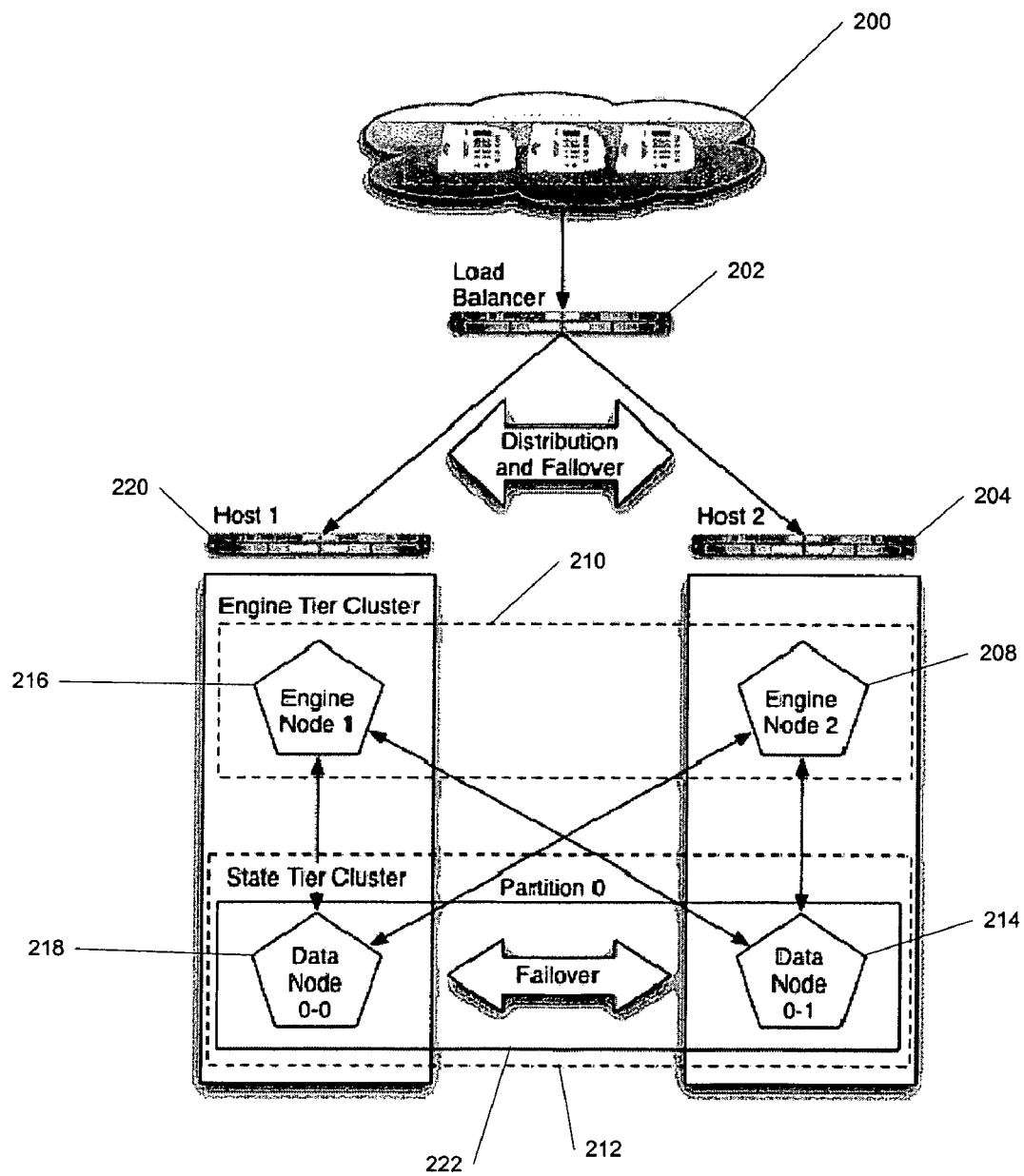
FIG. 2 is an exemplary illustration of the SIP server cluster architecture in accordance with various embodiments of the invention.

FIG. 2 is an exemplary illustration of the SIP server cluster architecture in accordance with various embodiments of the invention. Although this diagram depicts components as logically separate, such depiction is merely for illustrative purposes. It will be apparent to those skilled in the art that the components portrayed in this figure can be arbitrarily combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means. For example, while the FIG. 2 shows Host A implementing both an engine node and a data node, this should not be construed as limiting the invention. In many cases, it can be preferable to distribute the engine node and data node onto separate host machines. Similarly, while FIG. 2 illustrates two host machines, it is possible and even advantageous to implement many more such hosts in order to take advantage of distribution, load balancing and failover that such a system can provide.

As illustrated, a message, such as a phone call request or some other transfer of data associated with SIP, can come into the cluster from the internet (such as over VoIP), phone, or some other type of network 200. This message can be received and handled by a load balancer 202 which can be responsible distributing message traffic across the engines (such as engine node 1 216 and engine node 2 208) in the cluster. The load balancer can be a standard load balancing appliance hardware device and it is not necessary that it be SIP aware; there is no requirement that the load balancer support affinity between the engines 216, 208, and SIP dialogs or transactions. Alternatively, the load balancer can be implemented as software that distributes the messages to the various engines. In the various embodiments, the primary goal of the load balancer 202 can be to provide a single public address that distributes incoming SIP requests to available servers in the SIP server engine tier 210. Such distribution of requests can ensure that the SIP server engines are fully utilized. The load balancer 202 can also be used for performing maintenance activities such as upgrading individual servers or applications without disrupting existing SIP clients.

In one embodiment, the SIP server can provide a two-tier cluster architecture model to handle the incoming messages. In this model, a stateless engine tier 210 can process all signaling traffic and can also replicate transaction and session state to the state tier 212 and its partitions 222. Each partition 222 can consist of any number of nodes (replicas) 218, 214 distributed across any number of hosts such as host 1 220 and host 2 204 which can be implemented as computers linked in a cluster type network environment. The state tier 212 can be an n-way peer-replicated Random Access Memory (RAM) store that maintains various data objects which can be accessed by the engine nodes in the engine tier. In this manner, engines can be provided a dual advantage of faster access to the data objects than retrieving data from a database while at the same time, engines can be freed up from having to store the data onto the engine tier itself. This type of separation can offer various performance improvements. The state tier can also function as a lock manager where call state access follows a simple library book model, (i.e. a call state can be checked out by one SIP engine at a time).

The engine tier 210 can be implemented as a cluster of SIP server instances that hosts the SIP servlets which provide various features to SIP clients. In one embodiment, the engine tier 210 is stateless, meaning that most SIP session state information is not persisted in the engine tier, but is obtained by querying the state tier 212 which can in turn provide replication and failover services for SIP session data.

The primary goal of the engine tier 210 can be to provide maximum throughput combined with low response time to SIP clients. As the number of calls or their duration increases, more server instances can be added to the engine tier to manage the additional load. It should be noted however, that although the engine tier may include many such server instances, it can be managed as a single, logical entity. For example, the SIP servlets can be deployed uniformly to all server instances by targeting the cluster itself and the load balancer need not maintain affinity between SIP clients and individual servers in the engine tier.

In various embodiments, the state tier 212 can be implemented as a cluster of SIP server instances that provides a high-performance, highly-available, in-memory store for maintaining and retrieving session state data for SIP servlets. This session data may be required by SIP applications in the SIP server engine tier 210 in order to process incoming messages. Within the state tier 212, session data can be managed in one or more partitions 222, where each partition manages a fixed portion of the concurrent call state. For example, in a system that uses two partitions, the first partition could manage one half of the concurrent call state (e.g. A-M) and the second partition can manage the other half (e.g. N-Z). With three partitions, each can manage a third of the call state and so on. Additional partitions can be added as needed to manage large number of concurrent calls.

In one embodiment, within each partition 222, multiple servers can be added to provide redundancy and failover should the other servers in the partition fail. When multiple servers participate in the same partition 222, those servers can be referred to as replicas because each server maintains a duplicate copy of the partition's call state. For example, nodes 218 and 214 of the partition 222 can be implemented as replicas. Furthermore, to increase the capacity of the state tier 212, the data can be split evenly across a set of partitions, as previously discussed. The number of replicas in the partition can be called the replication factor, since it determines the level of redundancy and strength of failover that it provides. For example, if one node goes down or becomes disconnected from the network, any available replica can automatically provide call state data to the engine tier.

Replicas 214, 218 can join and leave the partition 222 and each replica can serve as exactly one partition at a time. Thus, in one embodiment, the total available call state storage capacity of the cluster is a summation of the capacities of each partition 222.

In one embodiment, each partition 222 can peer-replicated, meaning that clients perform all operations (reads/writes) to all replicas 218, 214 in the partition wherein the current set of replicas in the partition is called the partition view. This partition view can have an increasing ID for example. The view of the partition can be represented in any number of ways (e.g. table with replica ids) and this disclosure is not limited to any particular implementation. Peer replication can provide improved latency advantages over more traditional synchronous "primary-secondary" architecture wherein one store acts as a primary and the other nodes serve as secondaries. Latency is reduced because there is no wait for the second hop of primary-secondary systems. The peer-replicated scheme can provide better failover characteristics as well, since there does not need to be change propagation delay.

In one embodiment, the engine nodes 208, 216 can be responsible for executing the call processing. Each call can have a call state associated with it. This call state can contain various information associated with the call, such as the ids of the caller/callee, where the caller is, what application is running on the callee, as well as any timer objects that may need to fire in order to process the call flow as discussed below. The state for each call can be contained in the state tier 212. The engine tier 210, on the other hand, could be stateless in order to achieve the maximum performance. In alternative embodiments, the engine tier can have small amounts of state data stored thereon at various times.

In one embodiment, a typical message processing flow can involve locking/getting the call state, processing the message and putting/unlocking the call state. The operations supported by the replicas for normal operations can include (but are not limited to):

lock and get call state
put and unlock call state
lock and get call states with expired timers In various embodiments, the engine tier can maintain mainly short lived objects and any long lived objects which may be needed for message processing can be stored on the state tier. This can provide improvements in latency during garbage collection. As an illustration, the Java Virtual Machine (JVM) garbage collector can safely and quickly remove the short lived objects from memory without interfering with the execution of various other threads which may be in the process of executing. The longer lived objects, on the other hand, are not as easily removed by the garbage collector (since they may be referenced and depended on by various entities) and thus in some cases, the JVM garbage collector may need to stop processing all threads in order to safely perform its garbage collection. This is due in part to the scoping of the short lived and long lived objects. Short lived objects typically exist in a different (more localized) memory scope than the long lived objects, which may be referenced by more entities. Thus, it can be more difficult for garbage collectors to ensure that every executing entity has finished using the long lived objects and various threads are usually stopped in order to perform their regular garbage collection. This can introduce latency.

In order to deal with such issues, the engine tier can maintain mainly short lived objects. In cases where longer lived objects are needed by the engine tier, they can be retrieved from the state tier, used as short lived objects in the engine tier, and subsequently pushed back to the state tier. This can be advantageous in that garbage collection can cause lesser interference with thread execution in the engine tier.

In various embodiments, the state tier 212 can maintain call state in various data objects residing in the random access memory (RAM) of a computer. This can provide significant access speed advantages to the engine tier 210. Alternatively, if latency is not an issue, call state can be maintained in a database or some other form of persistent store, which can be accessed (albeit slower) by the engine tier. State of various applications running on the SIP server can also be maintained on the state tier. Developers can be provided an API to allow their applications to access the state tier and to store various data thereon for later access by various applications. Alternatively, application state may be stored in a database.

Failover

As previously described, the engine tier servers can continually access the state tier replicas in order to retrieve and write call state data. During this process, the engine tier nodes can detect when a state tier server has failed or become disconnected. For example, when an engine cannot access or write call state data for some reason (e.g. the state tier node has failed or become disconnected) then the engine can connect to another replica in the partition and retrieve or write data to that replica. The engine can also report that failed replica as being offline. This can be achieved by updating the view of the partition and data tier such that other engines can also be notified about the offline state tier server as they access state data.

Additional failover can also be provided by use of an echo server running on the same machine as the state tier server. The engines can periodically send heartbeat messages to the echo server, which can continually send responses to each heartbeat request. If the echo server fails to respond for a specified period of time, the engines can assume that the state tier server has become disabled and report that state server as previously described. In this manner, even quicker failover detection is provided, since the engines can notice failed servers without waiting for the time that access is needed and without relying on the TCP protocol's retransmission timers to diagnose a disconnection.

Failover can also be provided for the engine tier nodes. For example, the engine tier nodes can periodically poll the state tier nodes in order to determine which timer objects need to fire, as will be discussed in further detail below. In turn, the state tier nodes can notice whenever the engine tier node has failed to poll. If a specified period of time elapses and the engine tier has not polled the state tier, the state replica that should have received the poll from the engine, can then report that engine as unavailable (e.g. having failed or disconnected from the network). The engine node can be reported by the replica to the other engine nodes in the cluster. These engine nodes, once notified, can take the failed engine node out of the view of the cluster, such that calls will no longer be routed to it by the load balancer. In this manner, failover can be implemented for both the state tier and the engine tier, thereby providing a more reliable and secure cluster for message processing.

Figure 3:
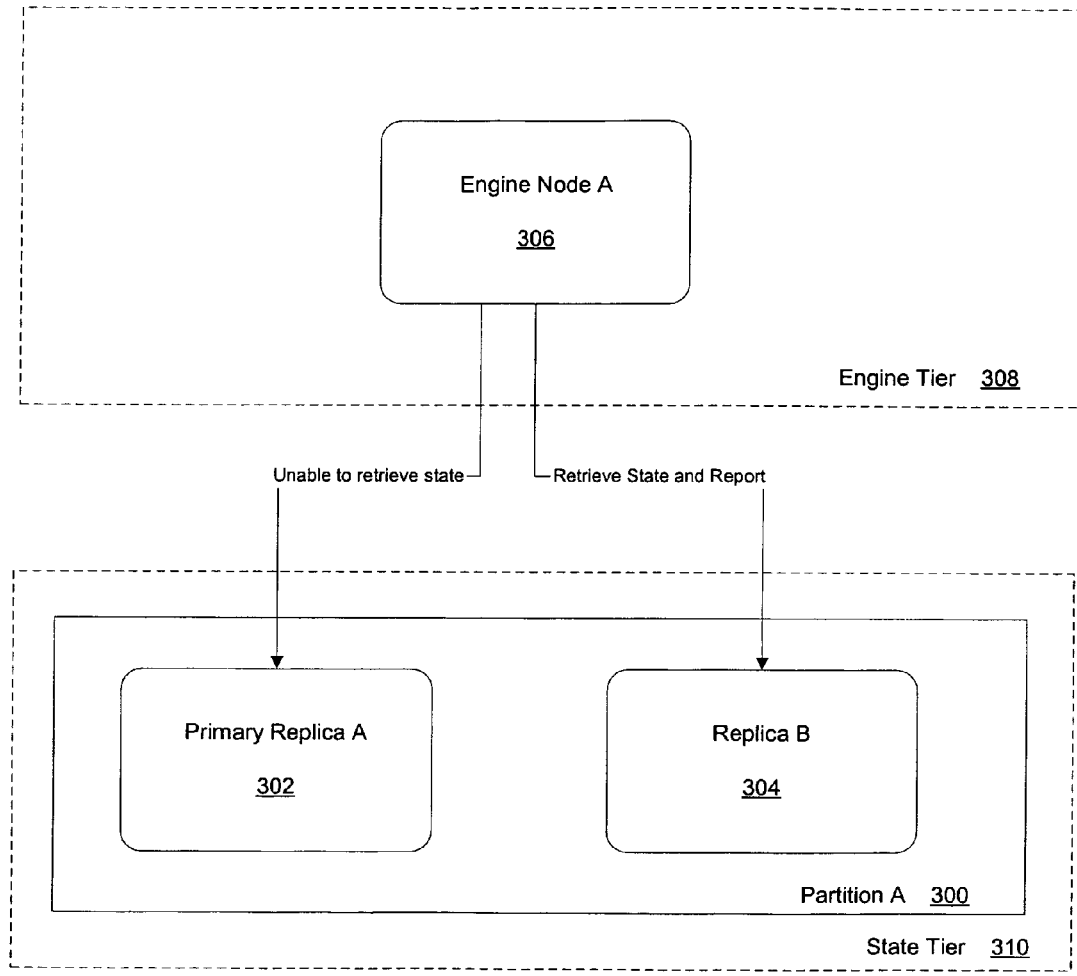
FIG. 3 is an exemplary illustration of state tier failover for the SIP server, in accordance with various embodiments of the invention.

FIG. 3 is an exemplary illustration of state tier failover for the SIP server, in accordance with various embodiments of the invention. Although this diagram depicts components as logically separate, such depiction is merely for illustrative purposes. It will be apparent to those skilled in the art that the components portrayed in this figure can be arbitrarily combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

As illustrated, during message processing, various engine nodes in the engine tier 308, such as engine node A 306 communicate with each replica 302, 304 in the partition 300. Depending on the network and call handling requirements, the SIP server can allow for multiple partitions (not shown) in the state tier 310. During the usual flow of processing, these communications are successful, but sometimes a failure or a view change can be detected. In one embodiment, a view change can signal that a new replica has joined the partition or that an existing replica has left the partition.

In this figure, a failure is shown as being detected by the engine node A 306. As an example, this can occur by the engine node requesting state information from primary replica A 302 and replica A failing to respond to the request. In various embodiments, failures can also be detected in other ways and it is not intended that the invention be limited by any particular method to detect such failures. Upon detecting the failure, the engine node A 306 can send a "replica died" message to any replicas in the partition A 300 (such as replica B 304), as well as retrieve any needed state from the notified replica 304. In the case where there are no more replicas in the partition, the partition A 300 could be declared dead and steps can be taken to restore the partition. In this fashion, the engine node A can report a failed replica to other replicas.

Upon receiving a "failed replica" notification, replica B 304 can take appropriate steps to propose a new partition view that excludes the dead replica. The various engine nodes can then be informed of the updated partition view and subsequently cease requesting state from the failed replica. In one embodiment, when faced with a new partition, the engine nodes that are performing a lock/get state operation, can immediately back off and retry their operations with the new view. As an illustration, the SIP server engine can schedule a ten millisecond retry for this operation, after which time the lock/get operation can be retried with the new view.

In case of a view change occurring during a put operation, the new view can first be inspected for added replicas in order to determine whether the view has changed because of a new replica joining the partition or an existing replica having left the partition because of failure. If it is determined that a new replica has joined the partition, that new replica can also get the put request in order to ensure consistency in the state within the partition.

In various embodiments, failover can also be provided for the engine tier. The state replicas can be responsible for detecting engine failure. Engine failure can have undesirable effects beyond the mere loss of processing power. For example, if the engine is in the process of a lock/get or put/unlock operation during the failure, it may abandon the locked call state for the messages that it is currently processing. Furthermore, if the engine node is in the middle of processing a set of timer objects, they may be abandoned because of the failure. Measures can be taken against such dangers.

In one embodiment, the engine tier nodes are set to process the timer objects by periodically polling the state tier and querying for the timer objects which have expired and need to be processed. For example, the SIP server may need to re-send a particular message to a SIP client upon the expiration of a period of time because it can be assumed that the client did not receive it the first time it was sent. Such re-transmission can be controlled by various timer objects. The engines can periodically (e.g. every 200 ms) poll the state tier to be provided with a set of timer objects which need to be processed. At this point, the state tier can provide a subset of all the expired timer objects to each engine for processing. In effect, the engine can "check out" the timer objects in order to process them.

In the case of an engine node failing to poll for a longer than specified period of time, the state replica can assume that the engine node has failed or has become disconnected from the network. At this point, it can inform other entities in the network about its failure such that calls are no longer being forwarded to the dead engine. Additionally, the state tier can take measures to prevent any undesirable effects on state and timer objects.

If the engine node is in the process of a lock/get operation when it fails, there is a risk of permanently locking the state for the message being processed. On the other hand, if the engine node is performing a put/unlock, there may by data inconsistencies across the replicas in the partition. In order to deal with this, the replica can break the locks for call states if they are requested by another engine and the current lock holder is deemed failed. This can allow progress with the call state. Furthermore, to deal with possible data inconsistencies where locks have to be broken, the call state can be marked as "possibly stale" by the replica. Subsequently, when an engine evaluates the response of a get/lock operation, it can choose the best data available (i.e. if any replica in the partition reports non-stale data, the engine uses that data). Alternatively, if there exists no nonstale data, the "possibly stale" data may also be used since the data should only actually be stale if the single replica that had the nonstale version died in the intervening period.

If the engine node is in the middle of processing timer objects when it fails, there is a risk that those timer objects may be affected adversely (e.g. the set of timer objects may remain "checked out" indefinitely). As previously discussed, the engine nodes "check out" timer objects from the state tier in order to process them. When engine failure is detected by the replica, the set of checked out timer objects can be forcefully checked back in and rescheduled so that another engine can check out the set of timers and process them. In this manner, timer operations need not be affected by engine failure nor by replica failure.

Figure 4A:
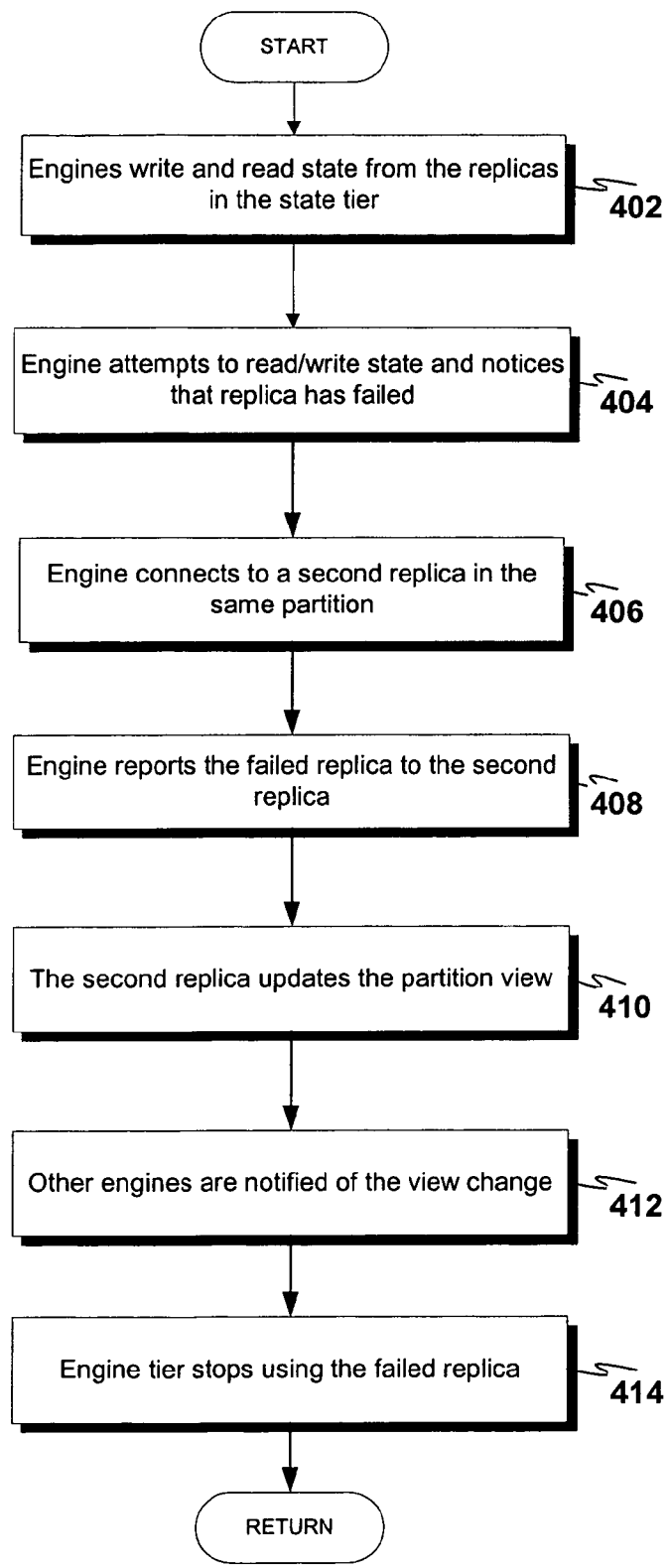
FIG. 4A is an exemplary flow diagram of state replica failover, in accordance with various embodiments of the invention.

FIG. 4A is an exemplary flow diagram of state replica failover, in accordance with various embodiments. Although this figure depicts functional steps in a particular sequence for purposes of illustration, the process is not necessarily limited to this particular order or steps. One skilled in the art will appreciate that the various steps portrayed in this figure can be changed, omitted, rearranged, performed in parallel or adapted in various ways.

As illustrated in step 402, the engines can write and read state information to and from the replicas in the state tier. For example, when handling a message request, an engine node may need state associated with the request and can retrieve it from a replica in the state tier partition. In one embodiment, the long lived objects are retrieved from the state tier, used as short lived objects in the engine tier and subsequently thrown out.

In step 404, during an attempt to read or write state information to the state tier, an engine may notice that a replica has failed or that the view for the partition has been changed. For example, the engine node may not be successful in retrieving the needed data. In one embodiment, the engine tier server uses its remote method invocation (RMI) connection to the replica to determine if the replica has failed or become disconnected. The algorithms used to determine a failure of an RMI connection can use the TCP protocol's retransmission timers to diagnose a disconnection (e.g. if the network cable to the replica is removed). At this point, the engine node can assume that the replica has failed, become disconnected from the network, or is otherwise not functioning properly. In alternative embodiments, other intermediate steps can be performed before making failure assumptions, such as attempting the retrieval process twice or detecting failures in another manner.

In step 406, the engine node can then connect to a second replica in the same partition, if one is available (with partitions that only implement one replica, failover possibilities may be more limited). Since the replica in the same partition has duplicate state as the failed replica, the engine node can retrieve the needed state from the second replica. Furthermore, the engine can also report the failed replica to the second replica in the partition, as illustrated in step 408. This can be implemented by sending a "replica died" message to all replicas in the same partition as the failed replica.

As illustrated in step 410, the replicas that have received the failure message from the engine node, can then propose a new view for the partition, one that would exclude the failed replica. Additionally, the status of the failed replica can be changed to be offline. Subsequently, other engine nodes can be notified of the updated partition view, as illustrated in step 412. This can have the effect that other engine node servers cease attempting to retrieve/write data from/to the failed replica, as illustrated in step 414.

In various embodiments, the state replicas can have various different statuses. For example, an "online" status can indicate that the server is available for managing call state transactions. An "offline" status can indicate that the server is shut down or unavailable. An "online_lock_authority_only" status can indicate that the server was rebooted and is currently being updated from other replicas with the current state information. In one embodiment, a recovering server cannot yet process call state transactions, because it may not maintain a full copy of the call state managed by the partition. These statuses can be used during administration of the SIP server. For example, if a state tier instances needs to be taken offline for scheduled maintenance, the system administrator can ensure that at least one other server in the partition is active. This can be performed in order to prevent inconsistencies and loss of state data.

Figure 4B:
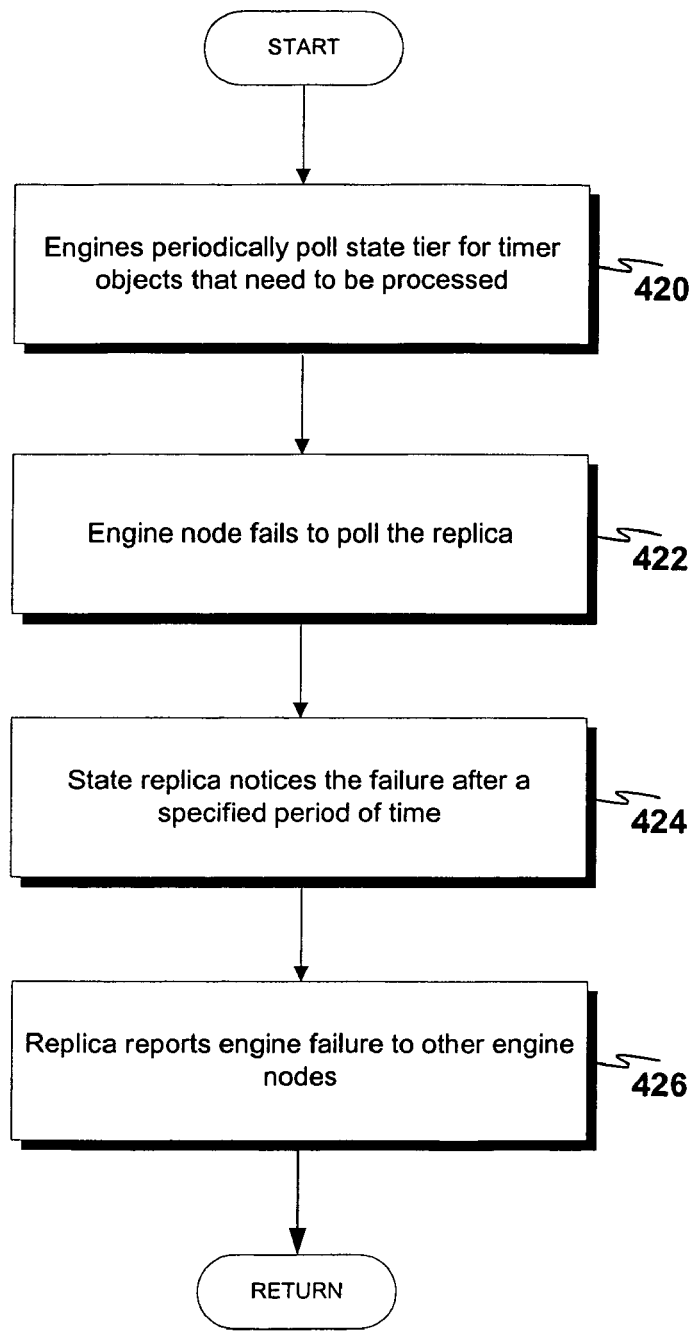
FIG. 4B is an exemplary flow diagram of engine node failover, in accordance with various embodiments of the invention.

FIG. 4B is an exemplary flow diagram of engine node failover, in accordance with various embodiments of the invention. Although this figure depicts functional steps in a particular sequence for purposes of illustration, the process is not necessarily limited to this particular order or steps. One skilled in the art will appreciate that the various steps portrayed in this figure can be changed, omitted, rearranged, performed in parallel or adapted in various ways.

As previously described, the engines can periodically poll the state tier replicas for which timer objects have expired and need to be processed, as illustrated in step 420. This poll can be a query sent to the replica after each specified period of time. However, at certain times, it is possible that an engine may fail to poll the replica due to engine failure, disconnection or some other fault within the system. Such an example is illustrated in step 424. The state replica can wait a specified period of time after the anticipated poll and after this period of time, the state replica can assume that the engine node has failed, as illustrated in 424. The period of time can be configurable in order to allow greater flexibility and improved response time to failover. After noticing the failure, the replica can report the engine failure to other engines in the cluster and possibly to the load balancer, such that calls are ceased from being routed to the dead engine.

At this point, the replicas can perform certain safety procedures in order to ensure the consistency of state and timer objects, as previously discussed. For example, the replica can unlock state that was previously locked by the failed engine. Similarly, the replica can check back in any timer objects which may have been checked out by the failed engine for processing. This can ensure a more reliable system by reducing any possible failure effects on the various system components.

Figure 4C:
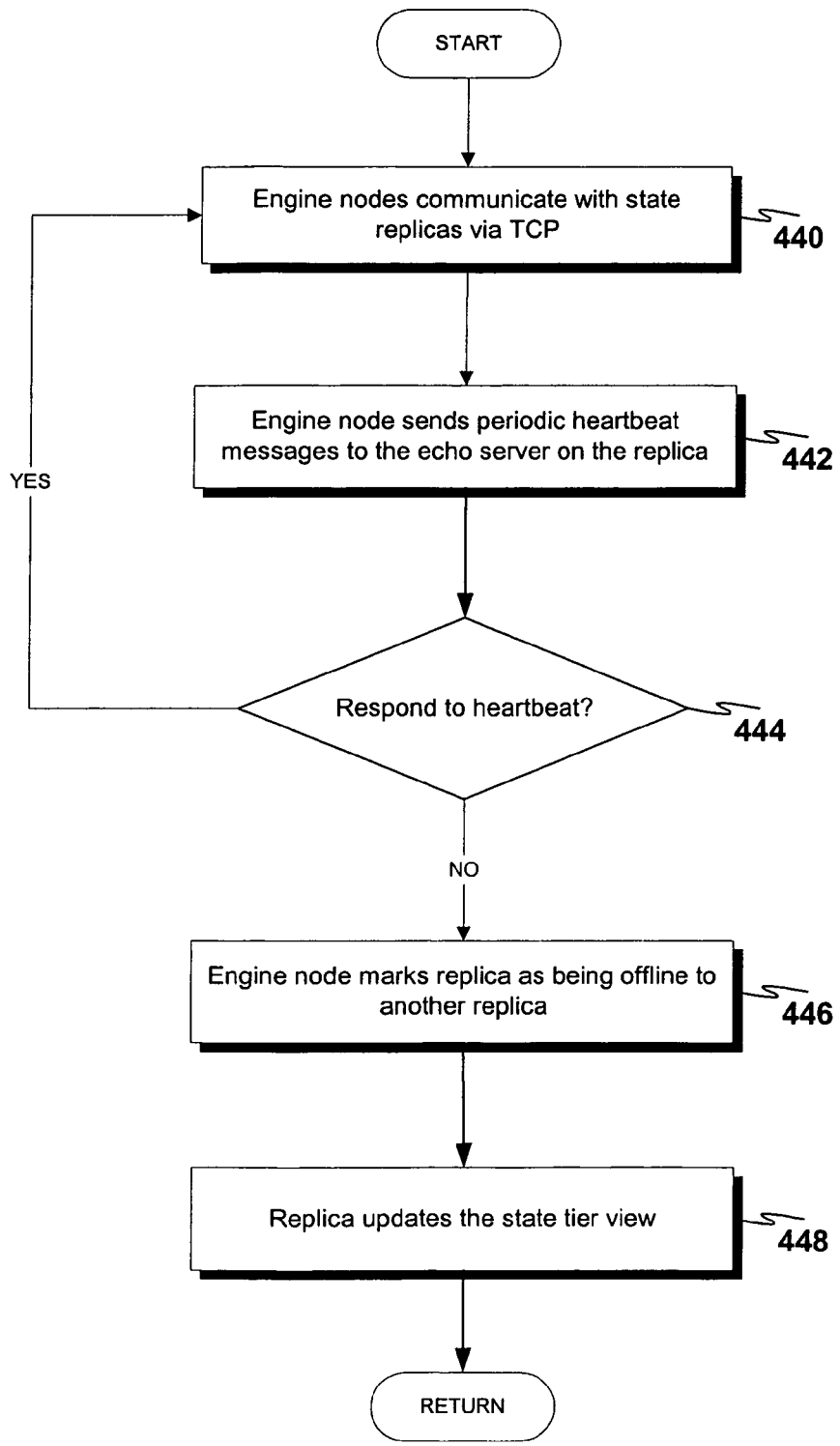
FIG. 4C is an exemplary flow diagram of failover detection via the use of an echo server, in accordance with various embodiments.

FIG. 4C is an exemplary flow diagram of failover detection via the use of an echo server, in accordance with various embodiments. Although this figure depicts functional steps in a particular sequence for purposes of illustration, the process is not necessarily limited to this particular order or steps. One skilled in the art will appreciate that the various steps portrayed in this figure can be changed, omitted, rearranged, performed in parallel or adapted in various ways.

As illustrated in step 440, the engine nodes can communicate with the state tier replicas via Transfer Control Protocol (TCP). In certain embodiments, each replica server can have an echo server running thereon. The echo server can be a separate process running on the same physical machine as the replica. The purpose of such an echo server can be to provide a simple user datagram protocol (UDP) echo service to engine tier nodes to be used for determining when the engine tier server goes offline.

In step 442, an engine node can send periodic heartbeat messages (e.g. pings) to the echo server running on the replica. In step 444, the echo server can respond to each heartbeat such that the connection between the engine node and the replica is verified. In the event that the responses are normal, the system can continue to function as previously described. In some cases, however, the replica can fail to respond to the heartbeat because of some fault or failure. In that case, an engine node can mark the replica as being offline without having to wait for the normal TCP connection timeout, as illustrated in step 446. At this point, the engine node can also contact some other replica within the partition in order to report the failure and have the partition view updated, as previously discussed.

Call Flow

In various embodiments, the SIP server can be responsible for processing messages and calls from SIP clients via the use of the engine and state tiers as described above. As an example, an application running on the engine tier can be implemented to receive messages from various SIP clients and to respond to those messages via the session initiation protocol. The flow of such calls can remain undisrupted by the failure of various state replicas or engine tiers by implementing the failover techniques previously described. The following is an exemplary description of a possible call flow processed by the SIP server architecture.

Figure 5:
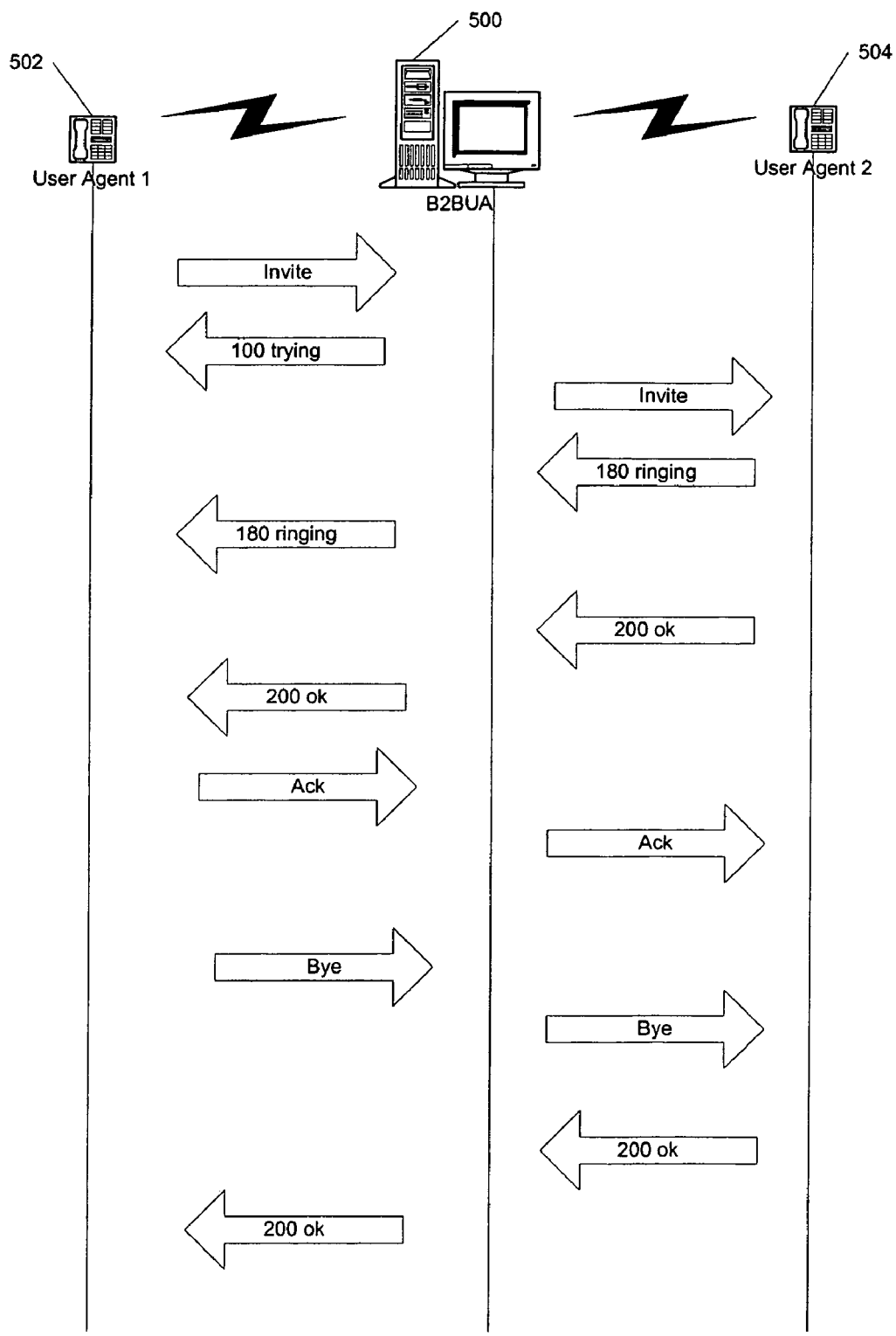
FIG. 5 is an exemplary illustration of a simplified call flow in a typical SIP communication session, in accordance with various embodiments.

FIG. 5 is an exemplary illustration of a simplified call flow in a typical SIP communication session, in accordance with various embodiments. Although this figure depicts functional steps in a particular sequence for purposes of illustration, the process is not necessarily limited to this particular order or steps. One skilled in the art will appreciate that the various steps portrayed in this figure can be changed, omitted, rearranged, performed in parallel or adapted in various ways.

As illustrated, a back to back user agent (B2BUA) 500, having a running SIP server thereon can take the place of being an intermediary between the communications sent between various users. This can be done for purposes of controlling the call and message flow between user agent 1 502 and user agent 2 504 and in order to prevent any unwanted behavior and messages (e.g. spamming, hacking, viruses, etc.) from being sent to the user agent device. It should be noted that although user agent 1 502 and user agent 2 504 are illustrated as telephones in FIG. 5, the SIP messages can come from various other sources as well. For example, the user agent can also be a cell phone, a wireless device, a laptop, an application or any other component that can initiate a SIP type of communication. Similarly, while FIG. 5 illustrates communications between two user agents (502, 504), there can be more such user agents taking part of a single communication session. For example, during a conference call, there may be 20 or 30 user agents for all attendees of the conference, each of which could send SIP messages to the B2BUA 500 and receive transmissions back therefrom.

Continuing with the illustration, a telephone call can be set up between user agent 1 502 and user agent 2 504 via the use of the SIP server. The first message sent from user agent 1 502 to the SIP server on the B2BUA 500 can be an invite message, requesting to set up a telephone call with user agent 2 504. The invite message can be received by the load balancer 202 of the SIP server and it can be directed to an engine in the engine tier 210 for processing.

In various embodiments, the engine tier (e.g. an application executing thereon) can then perform logic for determining various factors associated with the call, such as determining whether user agent 1 502 is allowed to make the type of call attempted to be initiated, determining whether the callee that will be contacted is properly identified, as well as any other logic that the server may need to calculate before attempting to set up a telephone call. The engine can then generate state around the fact that a call is being set up, including generating the proper long lived and short lived objects associated with the messages, as previously discussed. The engine can also determine how to find the target of the call (i.e. user agent 2 504) and the right path to route the message to the callee. As illustrated herein, user agent 1 is an originator (as well as the terminator) of the call and user agent 2 is referred to as the callee.

After receiving the invite message, the SIP server can send a "100 trying" message back to user agent 1 502, indicating that it has received the invite message and that it is in the process of handling it. The "100 trying" message is part of the SIP protocol definition and can be used by a server in order to stop the user agent from re-transmitting the invite request. In cellular phone environments, the user agent may have interference which might cause an interruption or loss of various messages. Therefore SIP protocol defines various re-transmission schemes in order to handle such mobility and interruptions. Messages such as "100 trying," "180 ringing," and "200 OK" are just some of the examples of messages defined in SIP for handling communication.

Continuing with the illustration, the SIP server can then send an invite message to the user agent 2 504 and can receive back a "180 ringing" message, indicating that user agent 2 504 has received the invitation and is now waiting for a user to answer. The SIP server engine tier can then transmit the "180 ringing" message back to user agent 1 502. When a person finally answers the phone, user agent 2 504 can then send a "200 ok" message to the SIP server, the server can transmit that message to user agent 1 502. The user agent 1 502 can send an acknowledgement ("Ack" message) to the SIP server which can be transmitted along to user agent 2 504 and at this point a sound transfer conversation can be set up between the two user agents. This sound transfer can be implemented via real transfer protocol (RTP) on a media server. At the end of the conversation, either user agent can choose to terminate the call by sending a "Bye" message. In this illustration, user agent 1 502 terminates the call by sending a "Bye" message to the SIP server which sends it off to user agent 2 504. After receiving back a "200 ok" message from user agent 2, the SIP server can transmit that message to user agent 1 and the conversation can be truly ended.

In various embodiments, the vertical lines such as those extending downward from the user agents 502, 504 and the B2BUA 500 can each illustrate and be referred to as a single call leg. The call flow for each call leg may be time sensitive as some messages should be received or sent before others can be initiated. For example, as illustrated herein, the user agent A 502 may continue to re-transmit the initial invite message until it receives a "100 trying" message from the B2BUA 500. As such, in some cases certain messages may need to be processed synchronously while others may be allowed to process in parallel.

It should also be noted that this illustration of a call may be overly simplified for purposes of clarity. For example, there can be various other message transmissions (not illustrated) such as authentication messages for caller/callee, determining the type of user agent the SIP server is communicating with and various other handshaking messages that can be exchanged between the SIP server and the user agents. Furthermore, message transmitting steps may be added, changed, interrupted or rearranged in case of interference or failure of various components.

Timer Objects

As previously discussed, in various embodiments there may be specific sequences of messages exchanged between the SIP server and the user agents for controlling the flow of the call. These sequences can be controlled by various timer objects residing on the SIP server. As a nonlimiting illustration, after receiving the invite message from one user agent, the SIP server will typically forward that invite to another user agent and wait for a response. If no response is received within a period of time (e.g. a number of milliseconds), then the invite message may need to be retransmitted to the second user agent because it may be assumed that the user agent did not receive the first message. This type of re-transmission can be controlled by the protocol timer objects which may be residing in the state tier. In one embodiment, an initial T1 timer value of 500 milliseconds can control the retransmission interval for the invite request and responses and can also set the value of various other timers.

In various embodiments, there are also other timer objects which can be executing on the level of the entire call. For example, if after a specified period of time, nothing is heard back from either user agent, the entire call may be purged from the system. This specified period of time can also be controlled by firing a timer object.

In one embodiment, as engine tier servers add new call state data to the state tier, state tier instances queue and maintain a complete list of SIP protocol timers and application timers associated with each call. Engine tier servers can periodically poll the partitions of the state tier to determine which timers have expired given the current time. In order to avoid contention on the timer tables, multiple engine tier polls to the state tier can be staggered. The engine tier can then process the expired timers using threads in the sip.timer.Default execute queue. Thus, the processing of the timer objects can be executed by the engine server as determined by the state tier server. For example, the state tier can tell the engine A to execute the first half of all due timer objects (e.g. 1-100) and tell engine B to execute the other half (e.g. 101-200). The state tier can also simultaneously push the state onto the engine, since the state may need to be employed in executing the timer objects. The engines can then process the timer objects (e.g. by sending appropriate messages, ending appropriate calls) and can later again query poll the state tier for which timers have become due.

In various embodiments, it may be preferable to synchronize system server clocks to a common time source (e.g. within a few milliseconds) in order achieve maximum performance. For example, an engine tier server with a system clock that is significantly faster than other servers may process more expired timers than the other engine tier servers. In some situations this may cause retransmits to begin before their allotted time and thus care may need to be taken to ensure against it.

In various embodiments, the SIP Servlet API can provide a timer service to be used by applications. There can be TimerService interface which can be retrieved from as a ServletContext attribute. The TimerService can define a "createTimer(SipApplicationSession appSession, long delay, boolean isPersistent, java.io.Serializable info)" method to start an application level timer. The SipApplicationSession can be implicitly associated with the timer. When a timer fires, an application defined TimerListener is invoked and ServletTimer object passed up, through which the SipApplicationSession can be retrieved which provides the right context of the timer expiry.

In other aspects, the invention encompasses in some embodiments, computer apparatus, computing systems and machine-readable media configured to carry out the foregoing methods. In addition to an embodiment consisting of specifically designed integrated circuits or other electronics, the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to program a computer to perform any of the processes of the present invention. The storage medium can include, but is not limited to, any type of rotating media including floppy disks, optical discs, DVD, CD-ROMs, microdrive, and magneto-optical disks, and magnetic or optical cards, nanosystems (including molecular memory ICs), or any type of media or device suitable for storing instructions and/or data.

Stored on any one of the machine readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications.

Included in the programming (software) of the general/specialized computer or microprocessor are software modules for implementing the teachings of the present invention, including, but not limited to providing systems and methods for providing the SIP server architecture as discussed herein.

Various embodiments may be implemented using a conventional general purpose or specialized digital computer(s) and/or processor(s) programmed according to the teachings of the present disclosure, as can be apparent to those skilled in the computer art. Appropriate software coding can readily be prepared by skilled programmers based on the teachings of the present disclosure, as can be apparent to those skilled in the software art. The invention may also be implemented by the preparation of integrated circuits and/or by interconnecting an appropriate network of conventional component circuits, as can be readily apparent to those skilled in the art.

Embodiments can provide, by way of example and without limitation, services such as:

VoIP services, including, without limitation the following features:

Basic features. These include standards services such as Voice mail, Caller ID, Call waiting, and call forwarding (the ability to forward a call to a different number).

Advanced features. Following is a brief list of advanced features:

Call logs: The ability to view calls made over a given period of time online, ability to associate names with phone numbers, integrate call log information to other applications such as IM.

Do not disturb: The ability to specify policies around receiving calls—for example, all calls during office hours to be automatically forwarded to a mobile terminal, all calls during the night to be directed to voice mail etc.

Locate me: This is advanced call forwarding. Rather than have all calls forwarded to a single location (e.g., voice mail) when the caller is busy, Locate me can try multiple terminals in series or in parallel. For example, a user may have two office locations, a mobile, and a pager, and it may make sense to forward a call to both office locations first, then the pager, and then the mobile terminal. Locate me is another example of feature interaction.

Personal conferencing: A user could use an existing application (e.g., IM client) to schedule a Web/audio conference to start at a certain time. Since the IM client already has personal profile information, the conferencing system sends out the Web conference link information either through IM and/or email to the participants. The phone contact information in the profile is used to automatically ring the participants at the time of the conference.

Lifetime number: This is the facility where a single virtual number can travel with a customer wherever they live. Even if they move, the old number continues to work, and reaches them at their new location. This is really the analog of static IP addresses in a phone network.

Speed dial: This is the ability to dramatically expand the list of numbers that can be dialed through short-key and accelerator combinations. This is another example of a converged application, since it's very likely that when a user will set up this information when they work through the call logs on the operator user portal, and the updated information needs to be propagated to the network side in real-time.

Media delivery services, including, without limitation the following features:

Depending on the service level agreement users are willing to sign up to, the quality of media delivered (e.g. number of frames per second) will vary. The policy engine enables segmenting the customer base by revenue potential, and to maximize return on investment made in the network.

Context-sensitive applications including, without limitation the following features:

A typical example here is the need for applications that have a short lifetime, extremely high usage peaks within their lifetime, and immediacy. For example, voting on American Idol during the show or immediately afterwards has proved to be an extremely popular application.

Integrated applications including, without limitation the following features:

The final class of applications is one that combines wireline and wireless terminal usage scenarios. An example of an integrated application is the following: a mobile terminal user is on a conference call on their way to work. When he reaches his office, he enters a special key sequence to transfer the phone call to his office phone. The transfer happens automatically without the user having to dial in the dial-in information again. It's important to note hear that this capability be available without the use of any specific support from the hand-set (a transfer button for example).

Various embodiments include a computer program product which is a storage medium (media) having instructions stored thereon/in which can be used to program a general purpose or specialized computing processor(s)/device(s) to perform any of the features presented herein. The storage medium can include, but is not limited to, one or more of the following: any type of physical media including floppy disks, optical discs, DVDs, CD-ROMs, micro drives, magneto-optical disks, holographic storage, ROMs, RAMs, PRAMS, EPROMs, EEPROMs, DRAMs, VRAMs, flash memory devices, magnetic or optical cards, nanosystems (including molecular memory ICs); paper or paper-based media; and any type of media or device suitable for storing instructions and/or information. Various embodiments include a computer program product that can be transmitted in whole or in parts and over one or more public and/or private networks wherein the transmission includes instructions which can be used by one or more processors to perform any of the features presented herein. In various embodiments, the transmission may include a plurality of separate transmissions.

Stored one or more of the computer readable medium (media), the present disclosure includes software for controlling both the hardware of general purpose/specialized computer(s) and/or processor(s), and for enabling the computer(s) and/or processor(s) to interact with a human user or other mechanism utilizing the results of the present invention. Such software may include, but is not limited to, device drivers, operating systems, execution environments/containers, user interfaces and applications.

The foregoing description of the preferred embodiments of the present invention has been provided for purposes of illustration and description. It is not intended to be exhaustive or to limit the invention to the precise forms disclosed. Many modifications and variations can be apparent to the practitioner skilled in the art. Embodiments were chosen and described in order to best explain the principles of the invention and its practical application, thereby enabling others skilled in the relevant art to understand the invention. It is intended that the scope of the invention be defined by the following claims and their equivalents.

What is claimed is:

1. A computer implemented method for providing failover and fault tolerance, comprising:
   maintaining a replica for storing state information;
   maintaining an engine node that writes and reads state information to and from the replica and uses the state information to process messages;
   periodically polling the replica by the engine node;
   failing to poll by the engine node for a specified period of time; and
   determining that the engine node has failed by the replica upon expiration of the specified period of time;
   wherein the engine node periodically polls the replica for a set of expired timer objects that need to be processed by the engine node.

2. The method of claim 1 wherein the engine node checks out the set of expired timer objects in order to process the expired timer objects.

3. The method of claim 2 wherein upon failing to poll by the engine node, the replica checks in the set of expired timer objects such that the expired timer objects could be reassigned to be processed by another engine node.

4. A system for providing failover and fault tolerance, comprising:
- a replica connected to a cluster network and adapted to store state information used for processing messages; and
- an engine node connected to the cluster network and adapted to read and write the state information to and from the replica when processing the messages;
- wherein the replica is adapted to detect and report engine node failures in the cluster and the engine node is adapted to detect and report replica failures in the cluster; and wherein the engine node periodically polls the replica for a set of expired timer objects in order to check out the expired timer objects and to process the expired timer objects; and
- wherein the engine node periodically polls the replica for a set of expired timer objects in order to check out the expired timer objects and to process the expired timer objects.

5. A system for providing failover and fault tolerance, comprising:
- a replica connected to a cluster network and adapted to store state information used for processing messages; and
- an engine node connected to the cluster network and adapted to read and write the state information to and from the replica when processing the messages;
- wherein the replica is adapted to detect and report engine node failures in the cluster and the engine node is adapted to detect and report replica failures in the cluster; and
- wherein the engine node periodically polls the replica for a set of expired timer objects in order to check out the expired timer objects and to process the expired timer objects; and
- wherein the replica is adapted to notice that the engine node has failed to poll for a specified period of time and is further adapted to notify other engine nodes that the engine node has failed upon expiration of the period of time.

6. A system for providing failover and fault tolerance, comprising:
- a replica connected to a cluster network and adapted to store state information used for processing messages; and
- an engine node connected to the cluster network and adapted to read and write the state information to and from the replica when processing the messages;
- wherein the replica is adapted to detect and report engine node failures in the cluster and the engine node is adapted to detect and report replica failures in the cluster; and wherein the engine node periodically polls the replica for a set of expired timer objects in order to check out the expired timer objects and to process the expired timer objects; and
- wherein the engine node periodically polls the replica for a set of expired timer objects in order to check out the expired timer objects and to process the expired timer objects; and
- wherein the replica is adapted to check in the set of timer objects upon expiration of the specified period of time such that the timer objects could be checked out by another engine node for processing.

7. The system of claim 5, further comprising:
a second replica that stores duplicate state information with respect to the replica, wherein the engine node detects a failure of the replica and informs the second replica of the failure.

8. The system of claim 7, wherein upon detection of the failure of the replica, the second replica updates a view of the replicas such that the replica is excluded from the view.

9. The system of claim 5, wherein reading and writing state information by the engine node further includes:
- locking and reading the state information from the replica;
- processing the messages; and
- writing the state information to the replica and unlocking it.

10. The system of claim 9, wherein the replica unlocks a set of locked state information upon determining that the engine node has failed.

11. The system of claim 5, wherein during the reading or writing of the state information to the replica, the engine node detects a change in a view of replicas and wherein upon detecting the change in the view, the engine node discontinues the reading or writing of the state information.

* * * * *

UNITED STATES PATENT AND TRADEMARK OFFICE
CERTIFICATE OF CORRECTION

PATENT NO. : 7,661,027 B2
APPLICATION NO. : 11/545648
DATED : February 9, 2010
INVENTOR(S) : Anno R. Langen et al.

It is certified that error appears in the above-identified patent and that said Letters Patent is hereby corrected as shown below:

In column 2, line 20, delete "chum" and insert -- churn --, therefor.

Signed and Sealed this

Fourteenth Day of September, 2010

David J. Kappos
*Director of the United States Patent and Trademark Office*

UNITED STATES PATENT AND TRADEMARK OFFICE
CERTIFICATE OF CORRECTION

| | |
|---|---|
| PATENT NO. | : 7,661,027 B2 |
| APPLICATION NO. | : 11/545648 |
| DATED | : February 9, 2010 |
| INVENTOR(S) | : Langen et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 577 days.

Signed and Sealed this

Thirtieth Day of November, 2010

David J. Kappos
*Director of the United States Patent and Trademark Office*